US006771861B2

(12) United States Patent
Wagner et al.

(10) Patent No.: US 6,771,861 B2
(45) Date of Patent: Aug. 3, 2004

(54) HIGH PERFORMANCE, FLEXIBLE OPTICAL FIBER FURCATION

(75) Inventors: Karl M. Wagner, Hickory, NC (US); Kenneth T. James, Lenoir, NC (US)

(73) Assignee: Corning Cable Systems LLC, Hickory, NC (US)

(*) Notice: Subject to any disclaimer, the term of this patent is extended or adjusted under 35 U.S.C. 154(b) by 16 days.

(21) Appl. No.: 10/140,642

(22) Filed: May 7, 2002

(65) Prior Publication Data

US 2003/0210875 A1 Nov. 13, 2003

(51) Int. Cl.$^7$ ................................................ G02B 6/44
(52) U.S. Cl. ................................... 385/100; 385/114
(58) Field of Search .............................. 385/100–114

(56) References Cited

U.S. PATENT DOCUMENTS

| 4,626,067 A | 12/1986 | Watson ................... 350/96.2 |
| 5,231,688 A | 7/1993 | Zimmer ................... 385/139 |
| 5,561,731 A | * 10/1996 | Cooke et al. .............. 385/114 |
| 5,903,693 A | 5/1999 | Brown ..................... 385/100 |
| 5,915,055 A | 6/1999 | Bennett et al. ............ 385/59 |
| 5,970,195 A | 10/1999 | Brown ..................... 385/100 |
| 6,072,932 A | 6/2000 | Bennett et al. ........... 385/139 |
| 6,104,855 A | 8/2000 | Jeon ...................... 385/139 |
| 6,278,831 B1 | 8/2001 | Henderson et al. ......... 385/139 |

FOREIGN PATENT DOCUMENTS

| DE | 4311979 A1 | 10/1994 | ............ G02B/6/36 |
| EP | 0355639 A2 | 2/1990 | ............ G02B/6/36 |

OTHER PUBLICATIONS

Patent Abstract of Japan, 2000162481, Jun. 16, 2000.
Patent Abstract of Japan, 10197742, Jul. 31, 1998.
Patent Abstract of Japan, 09159839, Jun. 20, 1997.
Patent Abstract of Japan, 09197145, Jul. 31, 1997.
Advertisement for Schott Optovance, Lightwave Jan. 2002.

* cited by examiner

Primary Examiner—Khiem Nguyen

(57) ABSTRACT

This invention provides an apparatus and method for a high performance, flexible optical fiber furcation assembly that minimizes bending in the optical fibers throughout the life of the furcation assembly. The furcation assembly includes a flexible furcation body having a passageway with a first end and an opposed second end, the first end for receiving a fiber optic cable and the second end for routing a furcated leg, and holding material for flexibly securing and supporting the fiber optic cable and the furcated leg substantially within the single passageway. A method is provided for applying the furcation assembly to an optical cable. The apparatus and method of this invention apply to a variety of optical cable types.

17 Claims, 4 Drawing Sheets

HIGH PERFORMANCE, FLEXIBLE OPTICAL FIBER FURCATION

FIELD OF THE INVENTION

This invention relates generally to the field of fiber optic cable assemblies. More particularly, this invention relates to a high performance, flexible optical fiber furcation assembly.

BACKGROUND OF THE INVENTION

Fiber optic communications has experienced explosive growth. In just a few years, the transmission of communication signals for voice, video, data, and the like has soared, and more growth is planned as fiber optic communication technology improves and networks expand to provide greater access.

Inherent with any fiber optic network is the need to connect individual optical fibers from optical cables to other optical fibers by using one of a multitude of fiber optic assemblies. The connection of these optical fibers must be executed with great care and precision in order to minimize losses in the transmitted communication signal. These connections take a great deal of time because each optical fiber in a cable is usually manually routed and/or furcated and then individually connected to other optical fibers.

When furcating optic cables, a furcation assembly is used to reduce microbending of the optical fibers, which is a bending of the optical fiber that causes signal attenuation. The furcation assemblies known in the art suffer from the shortcomings of being rigid, difficult to manufacture, difficult to install, and/or sensitive to environmental factors that damage the cable sheath and/or the optical fibers. This damage typically results in increased signal attenuation.

A need therefore exists for a apparatus and method that provides an improved furcation assembly that enhances the performance of and minimizes the damage to optical fibers in a furcation assembly.

SUMMARY OF THE INVENTION

Accordingly, the present invention is directed to an apparatus and method to protect furcated optical fibers against mechanical and/or environmental factors. The present invention is also directed to a high performance, flexible furcation assembly that minimizes bending in the optical fibers throughout the life of the furcation assembly. Additional features and advantages of the invention will be set forth in the description which follows, and in part will be apparent from the description, or may be learned by practice of the invention. The objectives and other advantages of the invention will be realized and attained by the assembly and method particularly pointed out in the written description and claims hereof as well as the appended drawings.

To achieve these and other advantages and in accordance with the purpose of the invention, as embodied and broadly described, the invention is directed to a furcation assembly that includes a flexible furcation body having a first end and an opposed second end with a single passageway extending therebetween, the first end for receiving a portion of a fiber optic cable and the second end for routing at least one furcated leg of the fiber optic cable out of the furcation assembly, and holding means for flexibly securing and for flexibly supporting the portion of the fiber optic cable and the at least one furcated leg substantially within the single passageway, such that the holding means minimizes bending of the portion of the fiber optic cable and the at least one furcated leg.

According to another aspect, the invention is directed to a furcation assembly that includes a flexible furcation body having a single passageway with a first end and an opposed second end, the first end for receiving a portion of a fiber optic cable and the second end for routing a portion of at least one furcated leg of the fiber optic cable out of the furcation assembly, and holding means for flexibly securing and for flexibly supporting the portion of the fiber optic cable and the at least one furcated leg within the single passageway.

According to yet another aspect, the invention is directed to a method of applying a furcation assembly to a fiber optic cable that includes inserting a portion of a first end of the fiber optic cable into a flexible furcation body, the flexible furcation body having a first end and an opposed second end with a single passageway therebetween, stripping a cable sheath from the portion of the first end of the fiber optic cable to expose at least one optical fiber, fanning out a portion of the at least one optical fiber, sliding the flexible furcation body over a predetermined portion of the fanned-out portion of the at least one optical fiber and over a predetermined portion of the first end of the fiber optic cable, and introducing a holding means into the furcation body, wherein the holding means flexibly secure and flexibly support the portion of the first end of the fiber optic cable and the fanned-out portion of at least one optical fiber substantially within the single passageway.

According to another aspect, the invention is directed to a method of routing a fiber optic cable in a furcation assembly that includes inserting a portion of a first end of the fiber optic cable into a flexible furcation body, the flexible furcation body having a first end and an opposed second end with a single passageway therebetween, stripping a cable sheath from the portion of the first end of the fiber optic cable to expose at least one optical fiber, sliding the flexible furcation body over a predetermined portion of the at least one optical fiber and over a predetermined portion of the first end of the fiber optic cable, and introducing a holding means into the flexible furcation body, wherein the holding means flexibly secure and flexibly support the portion of the first end of the fiber optic cable and the at least one optical fiber substantially within the single passageway.

It is to be understood that the both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate several embodiments of the invention and together with the description serve to explain the principles of the invention.

DETAILED DESCRIPTION OF THE INVENTION

This invention now will be described more fully hereinafter with reference to the accompanying drawings, in which several of the embodiments of the invention are shown. This invention may, however, be embodied in many different forms and should not be construed as limited to the embodiments set forth herein; rather, the embodiments are provided so that this disclosure will be thorough and complete, and will fully convey the scope of the invention to those skilled in the art. Like numbers refer to like elements throughout.

Figure 1:
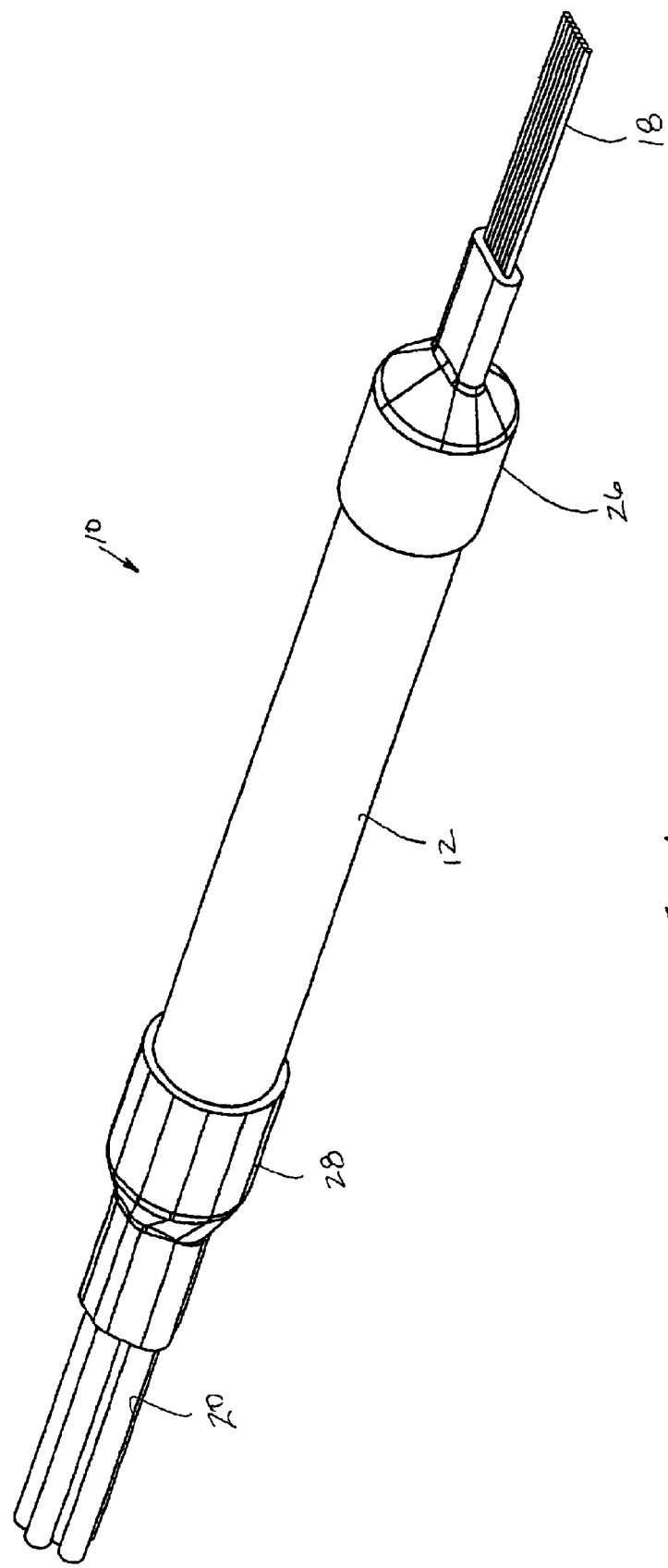
FIG. 1 is a perspective view of fiber optic furcation assembly according to an embodiment of this invention.
Figure 2:
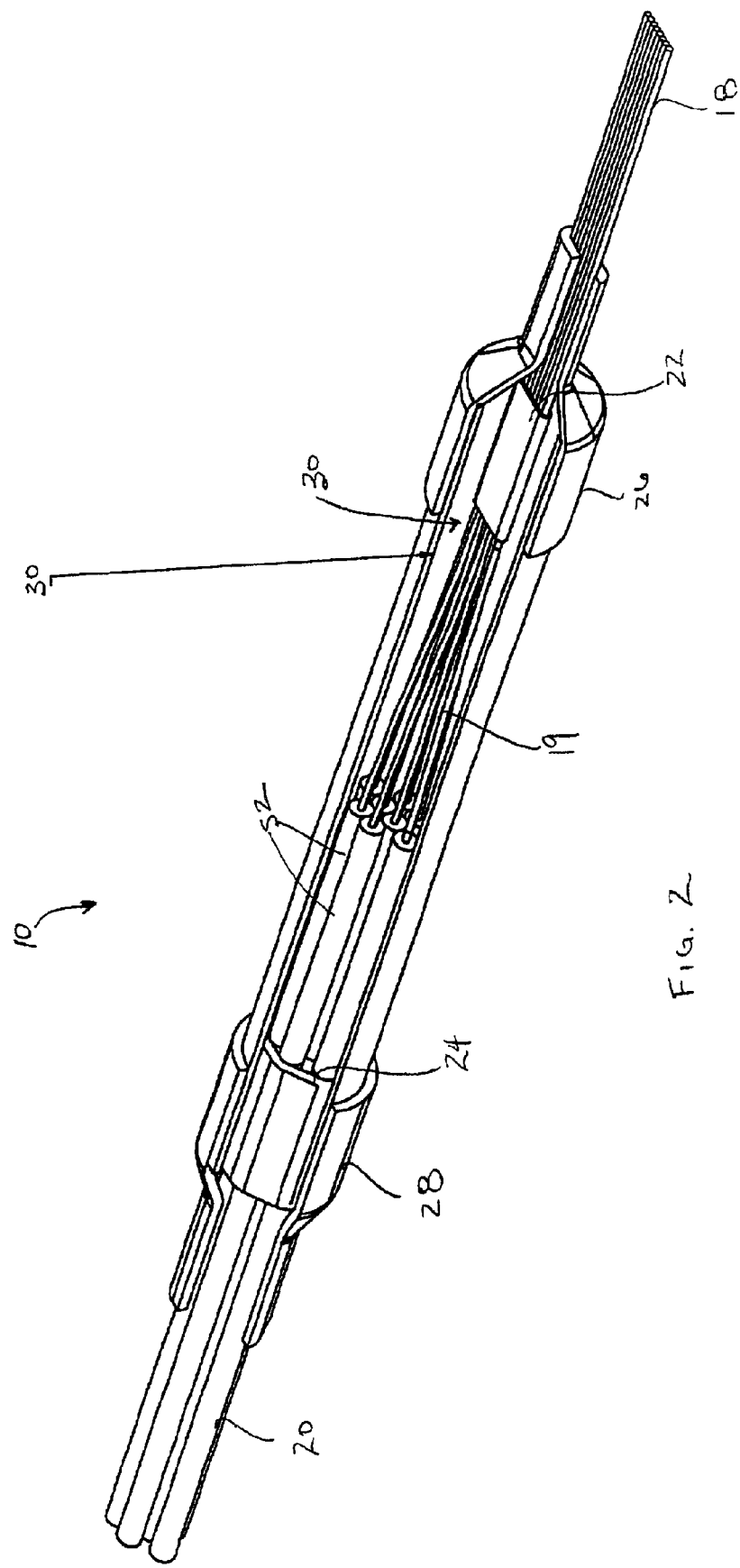
FIG. 2 is a partial cross-sectional view of the assembly of FIG. 1.
Figure 3:
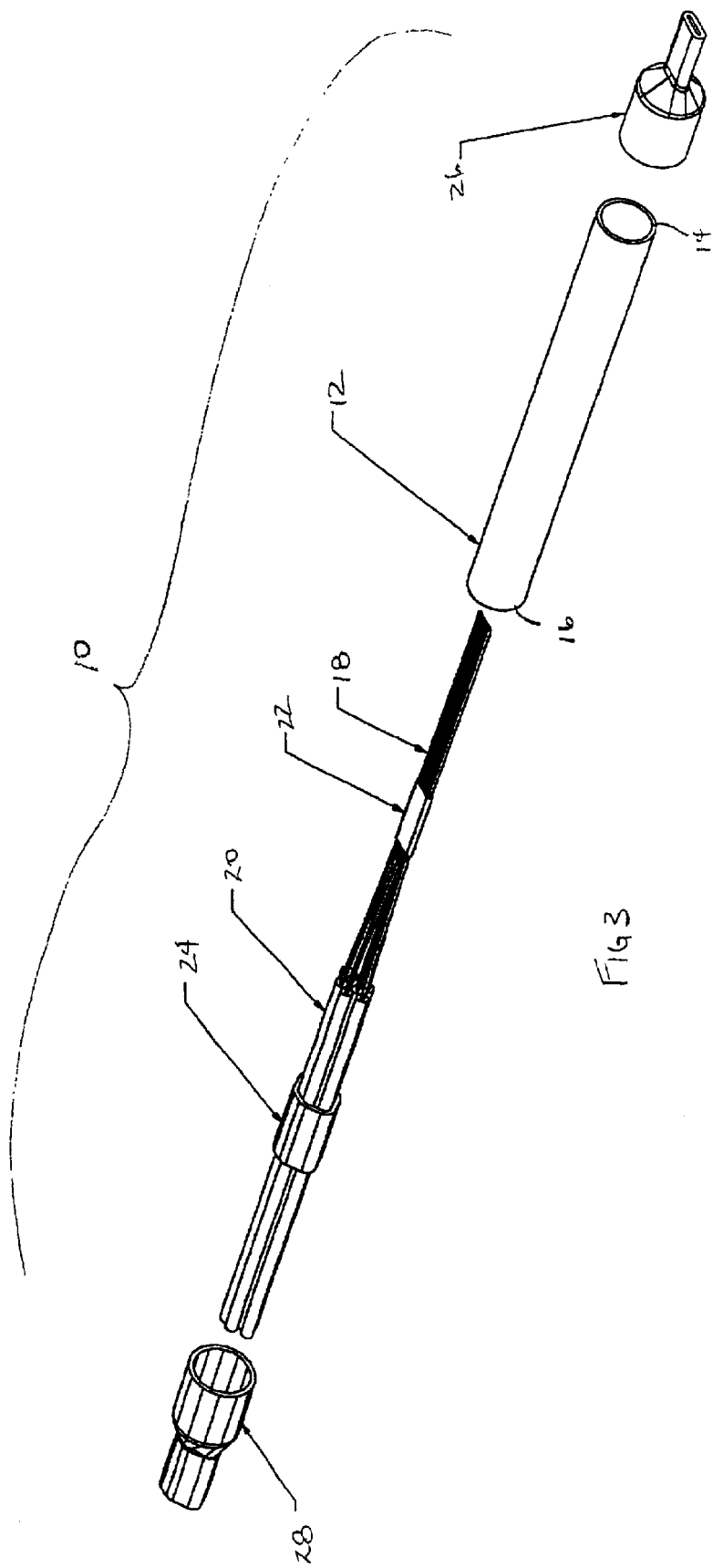
FIG. 3 is an exploded perspective view of the assembly of FIG. 1.

Referring now to FIGS. 1–3, a furcation assembly 10 in accordance with an embodiment of this invention is shown. The furcation assembly 10 includes a furcation body 12 having a single passageway 30 with a first end 14 and an opposed second end 16, the first end 14 for receiving a fiber optic cable 18, illustrated as an optical fiber ribbon, and the second end 16 for routing at least one leg 20 of the fiber optic cable out of the furcation assembly 10. While and optical fiber ribbon is shown, any optical cable in any configuration could be used. As shown best in FIGS. 2 and 3, the optical fibers 19 from the optical cable 18 are separated into a number of legs 20 and, as described in more detail below, covered with fan-out buffer tubes 52 before exiting the furcation assembly. However, it should be noted that the optical fibers, depending upon the cable design being furcated, may not need to have the illustrated fan-out buffer tubes. If such buffer tubes are to be used, the buffer tubes 52 may be fabricated out of nylon and be dimensioned so that the optical fiber easily passes through the buffer tube. Preferably, the buffer tube 52 has an outer diameter of about 900 microns and an inner diameter sufficient to allow the optical fiber, which has an outer diameter of about 250 microns, to be inserted therein. As seen in FIG. 2, a first end of the buffer tube is disposed within the furcation body 12 and a second end of the buffer tube is disposed outside the furcation body 12.

The furcation assembly 10 also preferably includes a first fiber optic holding component 22 securable about the fiber optic cable 18, and a second fiber optic holding component 24 securable around a portion of at least one leg of the fiber optic cable to support and secure the optical fibers during use and assembly, as discussed in more detail below. However, the holding components 22,24 may be excluded if desired as they assist in the manufacturing process, but are not required. The furcation assembly 10 also preferably includes a first furcation end component 26 securable about the first end 14 of the furcation body 12 and a second furcation end component 28 securable about the second end 16 of the furcation body 12. While the first and second components (the fiber optic holding components and the furcation end components) are illustrated as being radially aligned with one another, they do not have to be and, in fact, may not be radially aligned depending on the size and length of furcation body 12. Similarly, the holding components 22,24 and the end components 26,28 are preferably made of a glue-lined heat-shrink material, but any other material that would hold the optical fibers in place and seal the ends of the furcation body, respectively, would be acceptable, e.g., tape, bands, rubber boots, O-rings, etc. Furthermore, the end and holding components do not have to be of the same materials, but could be of any combination of acceptable materials. For example, the holding components could be rubber O-rings and the end components be rubber boots. Similarly, one holding component could be tape while the other end component is a glue-lined heat shrink material.

The single passageway 30 is filled with a holding and adhesive material 50, such as Dow Corning's® RTV sealant, filling the voids around the optical cable and that portion of the legs that are within the furcation body to thereby flexibly secure and support the fiber optic cable and optical fibers throughout the passageway 30. The furcation end components 26,28 seal the holding adhesive material within the single passageway and provide further environmental protection for the optical cable and optical fibers within the furcation assembly 10. The furcation body 12 is typically a flexible, lengthwise-extending, mesh tube having a hollow interior. Preferably, the furcation body is Varflex® HP tubing. The mesh tube, because it is breathable, allows the RTV sealant to cure around the cable, optical fibers, and legs. Other materials that cure and remain relatively flexible may also be used. However, the materials must cure without using heat, although UV-curable materials may also be used. If a UV-curable material is used, then the furcation body must be transparent to UV sources.

Figure 4:
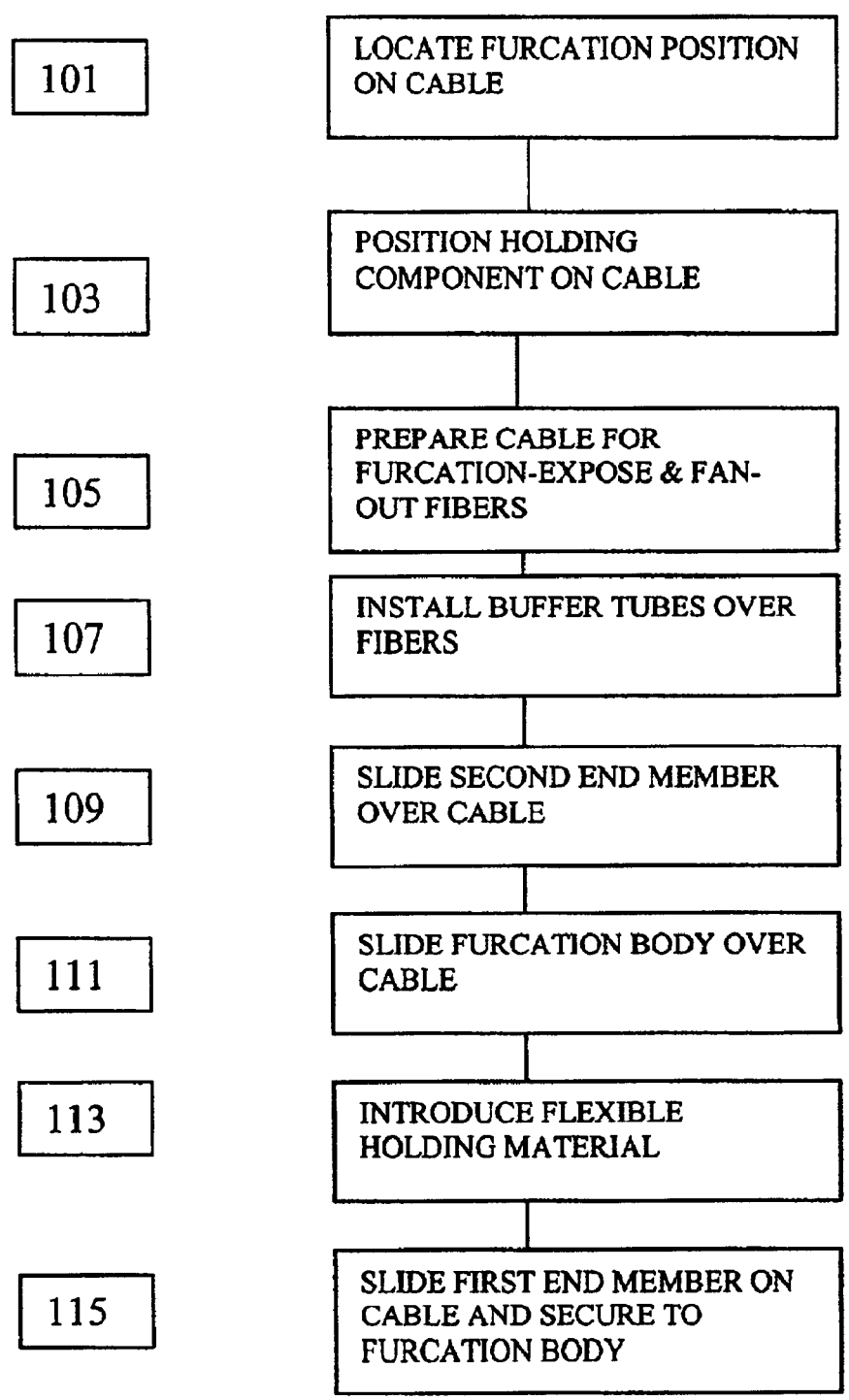
FIG. 4 is a flowchart illustrating operations performed according to a method.

In accordance another embodiment and as illustrated in FIG. 4, a method of applying a furcation assembly 10 to a fiber optic cable 18 is provided. The method includes, at step 101, determining the location on the fiber optic cable where the furcation is to be located. At steps 103–107, the cable is prepared for the furcation. At step 103 the cable can be inserted into a holding component 22, preferably a glue-lined heat-shrink component, at the position where the optical fibers are to be separated from one another, and secured to the fiber optic cable. The holding component 22 keeps the optical fibers from separating from one another further down the cable and away from the furcation site than desired. As noted above, the holding component also assists in the process, especially if the fiber optic cable 18 contains a plurality of loose fibers. Then at step 105, one end of the cable is prepared for the furcation. This step may include the striping of the ribbon matrix from the ribbon cable or other cable structure from the optical fibers, depending on the type of cable, to expose and separate or fan-out at least one optical fiber of about 250 microns in diameter, which will be the legs 20. Obviously, any or all of the optical fibers in the optical fiber cable can be furcated in any given furcation assembly. At step 107, a fan-out buffer tube 52 is preferably disposed over each optical fiber that is to be furcated. The fan-out buffer tubes 52 may all be bundled together with a second fiber optic holding member 24 before the optical fibers are placed therein. While this manner is preferable, the buffer tubes could be placed on each of the fibers before the buffer tubes are bundled together or they could be left loose. At step 109, the second furcation end member 28 is positioned over one end of the optical cable and, at step 111, a flexible furcation body 12 is positioned over cable so that the cable and fibers pass through the single passageway 30 of the furcation body 12. If the end members can be wrapped around the cable, such as tape, then only the furcation body needs to be positioned over the cable before the end member. One end of the furcation body is disposed relative to the second furcation end member to allow the end of the furcation body to be sealingly engaged by the second furcation end component. The flexible furcation body 12 and furcation end component 28 are positioned over a predetermined portion of the fiber optic cable and the furcated legs 20. As shown in FIG. 2, there is preferably a small gap between the first fiber optic holding member and/or cable (if no holding member is used or the cable extends beyond the holding member) and the end of the fan-out buffer tubes so that a portion of the optical fiber in each leg is exposed. At step 113, the holding material is introduced into the furcation body and allowed to dry, cure, or set, depending on the holding material. The holding material preferably secures and supports the fiber optic cable, the portion of the exposed optical fibers, and the legs in a flexible manner within the single passageway. At step 115, the first furcation end is disposed on the cable and securingly attached to the other end of the furcation body. It should be noted that either the first or the second furcation end member can be used first in the method and still be within the scope of the invention.

Several common disadvantages in prior art furcation assemblies is that they are not flexible, have poor performance, and do not provide a mechanism to flexibly secure and support the fiber optic cable and optical fibers throughout the passageway to minimize the formation of microbends in the optical fiber(s). The furcation assembly of this invention is extremely flexible and is able to withstand a wide range of temperature cycling (e.g., −40° C. to 85° C.) while minimizing microbending, hold tensile loads up to three pound increments for up to two minutes, and endure many other rigors.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A furcation assembly comprising:
   a flexible furcation body having a first end and an opposed second end with a single passageway extending therebetween, the first end for receiving a portion of a fiber optic cable and the second end for routing at least one furcated leg of the fiber optic cable out of the furcation assembly; and
   holding means for flexibly holding and supporting the portion of the fiber optic cable and the at least one furcated leg substantially within the single passageway, such that the holding means minimizes bending of the portion of the fiber optic cable and the at least one furcated leg.

2. The furcation assembly of claim 1, further comprising:
   at least one buffer tube for covering at least a portion of the at least one furcated leg, the at least one buffer tube having a first end and a second end, wherein the first end is located substantially within the flexible furcation body and wherein the second end is located substantially outside the flexible furcation body.

3. The furcation assembly of claim 2, wherein the buffer tube has a diameter of about 900 microns.

4. The furcation assembly of claim 2, wherein the at least one furcated leg has a diameter of about 250 microns.

5. The furcation assembly of claim 1, wherein the flexible furcation body comprises a lengthwise extending breathable tube.

6. The furcation assembly of claim 1, wherein the holding means comprises an adhesive for holding the portion of the fiber optic cable and the at least one furcated leg substantially within the single passageway.

7. The furcation assembly of claim 6, wherein the adhesive comprises silicone.

8. The furcation assembly of claim 1, further comprising:
   sealing means for substantially sealing the holding means within the single passageway.

9. The furcation assembly of claim 8, wherein the sealing means comprises:
   a first furcation end component sealingly engaging the first end of the flexible furcation body; and
   a second furcation end component sealing engaging the second end of the flexible furcation body.

10. A furcation assembly comprising:
    a flexible furcation body having a single passageway with a first end and an opposed second end, the first end for receiving a portion of a fiber optic cable and the second end for routing a portion of at least one furcated leg of the fiber optic cable out of the furcation assembly; and
    holding means for flexibly holding and supporting the portion of the fiber optic cable and the at least one furcated leg within the single passageway.

11. A method of applying a furcation assembly to a fiber optic cable, comprising:
    preparing the fiber optic cable to be furcated;
    sliding a flexible furcation body over a first end of the fiber optic cable, the flexible furcation body having a first end and an opposed second end with a single passageway therebetween; and
    introducing a holding means into the furcation body, wherein the holding means flexible holds and supports a portion of the fiber optic cable and at least one furcated leg of the fiber optic cable substantially within the single passageway.

12. The method of claim 11, wherein preparing the fiber optic cable includes stripping a portion of the fiber optic cable to expose at least one optical fiber.

13. The method of claim 11, wherein preparing the fiber optic cable includes fanning out at least one optical fiber from the fiber optic cable.

14. The method of claim 13, wherein preparing the fiber optic cable includes placing a fan-out buffer tube on the at least one optical fiber.

15. The method of claim 11, further comprising introducing a sealing means on at least one predetermined portion of the flexible furcation assembly wherein introducing a sealing means comprises:
    overmolding a thermoplastic resin on at least one predetermined end of the flexible furcation assembly.

16. The method of claim 11, further comprising:
    securingly attaching an end component at one end of the flexible furcation assembly.

17. A method of routing a fiber optic cable in a furcation assembly, comprising the steps of:
    inserting a portion of a first end of the fiber optic cable into a flexible furcation body, the flexible furcation body having a first end and an opposed second end with a single passageway therebetween;
    exposing at least one optical fiber at the first end of the fiber optic cable;
    sliding the flexible furcation body over at least a portion of the at least one optical fiber and a portion of the first end of the fiber optic cable; and
    introducing a holding means into the flexible furcation body, wherein the holding means flexibly secures and supports at least a portion of the at least one optical fiber and a portion of the first end of the fiber optic cable substantially within the single passageway.

* * * * *

UNITED STATES PATENT AND TRADEMARK OFFICE
CERTIFICATE OF CORRECTION

PATENT NO. : 6,771,861 B2
DATED : August 3, 2004
INVENTOR(S) : Karl M. Wagner and Kenneth T. James It is certified that error appears in the above-identified patent and that said Letters Patent is hereby corrected as shown below:

Column 6,
Line 24, delete "flexible" and substitute -- flexibly --.

Signed and Sealed this

Thirtieth Day of November, 2004

JON W. DUDAS
*Director of the United States Patent and Trademark Office*